(12) United States Patent
Kim

(10) Patent No.: US 8,835,028 B2
(45) Date of Patent: Sep. 16, 2014

(54) RECHARGEABLE BATTERY

(75) Inventor: Dukjung Kim, Yongin-si (KR)

(73) Assignees: Samsung SDI Co., Ltd., Giheung-gu, Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 681 days.

(21) Appl. No.: 13/091,656

(22) Filed: Apr. 21, 2011

(65) Prior Publication Data

US 2012/0196164 A1 Aug. 2, 2012

(30) Foreign Application Priority Data

Jan. 31, 2011 (KR) .......................... 10-2011-0009240

(51) Int. Cl.
*H01M 10/42* (2006.01)
*H01M 2/34* (2006.01)

(52) U.S. Cl.
CPC ...... *H01M 2/34* (2013.01); *Y02E 60/12* (2013.01); *H01M 10/42* (2013.01); *H01M 2200/00* (2013.01)
USPC ..................... 429/61; 429/53; 429/54; 429/57

(58) Field of Classification Search
USPC ................. 429/50–52, 53–56, 61–64, 90–93; 29/623.1–623.5
See application file for complete search history.

(56) References Cited

U.S. PATENT DOCUMENTS

| 7,527,890 | B2 | 5/2009 | Kodama et al. |
| 7,785,732 | B2 | 8/2010 | Chang et al. |
| 2006/0097701 | A1 | 5/2006 | Kodama et al. |
| 2006/0275666 | A1 | 12/2006 | Chang et al. |
| 2009/0053586 | A1 | 2/2009 | Fredriksson et al. |
| 2010/0227205 | A1 | 9/2010 | Byun et al. |
| 2010/0266879 | A1 | 10/2010 | Byun et al. |
| 2010/0279156 | A1 | 11/2010 | Kim et al. |
| 2010/0291421 | A1 | 11/2010 | Byun et al. |
| 2010/0323243 | A1 | 12/2010 | Yoshida et al. |
| 2011/0052949 | A1* | 3/2011 | Byun et al. ....................... 429/61 |

FOREIGN PATENT DOCUMENTS

| JP | 11-040203 | 2/1999 |
| KR | 20100099983 A | 9/2010 |
| KR | 20100116028 A | 10/2010 |
| KR | 20100123598 A | 11/2010 |
| KR | 2011-0005197 A | 1/2011 |

OTHER PUBLICATIONS

Korean Notice of Allowance issued on Jun. 29, 2012 by KIPO in connection with Korean Patent Application Serial No. 10-2011-0009240 and Request for Entry of the Accompanying Office Action attached herewith.

(Continued)

*Primary Examiner* — Basia Ridley
*Assistant Examiner* — Caitlin Wilmot
(74) *Attorney, Agent, or Firm* — Robert E. Bushnell, Esq.

(57) ABSTRACT

A rechargeable battery, which can improve safety, control operating level of a short-circuiting member, prevent external moisture from being induced to a short-circuiting member to cause a short-circuit, and can efficiently utilize an internal space. In an embodiment, the rechargeable battery includes an electrode assembly, a collector plate electrically connected to the electrode assembly, a case housing the electrode assembly and the collector plate, a cap plate sealing the case and having a short-circuiting groove formed at a lower portion thereof, and a short-circuiting member formed between the cap plate and the collector plate, wherein the short-circuiting member is coupled to the short-circuiting groove of the cap plate.

19 Claims, 5 Drawing Sheets

(56) References Cited

OTHER PUBLICATIONS

Korean Office Action issued on Jun. 29, 2012 by KIPO in connection with Korean Patent Application Serial No. 10-2011-0009240 and Request for Entry of the Accompanying Office Action attached herewith.

Korea Notice of Allowance dated Dec. 30, 2012 issued by KIPO for the corresponding Korean patent application 10-2011-0009240 with Request for Entry of the Accompanying Office Action.

\* cited by examiner

RECHARGEABLE BATTERY

CLAIM OF PRIORITY

This application makes reference to, incorporated the same herein, and claims all benefits accruing under 35 U.S.C. §119 from an application for RECHARGEABLE BATTERY earlier filed in the Korean Intellectual Property Office on 31 Jan. 2011 and there duly assigned Korean Patent Application No. 10-2011-0009240.

BACKGROUND OF THE INVENTION

1. Field of the Invention

Embodiments of the present invention relate to a rechargeable battery having an improved safety device.

2. Description of the Related Art

Unlike a primary battery, a rechargeable battery may be charged and discharged over and over again. A low capacity secondary battery that comprises a pack shaped battery cell may be used as a power source for various small portable electronic devices such as cellular phones, and camcorders. A high capacity secondary battery that has several tens of the battery cells that are connected may be used as a power source for driving motors such as in a hybrid automobile.

The rechargeable battery may be fabricated into various shapes, including a cylindrical and a prismatic shape, and may comprise an electrode assembly comprising an insulating separator interposed between a positive electrode and a negative electrode, the resultant being wound and inserted into a case. The case is closed and sealed with a cap assembly having an outer terminal to provide a battery.

Meanwhile, a rechargeable battery has a great potential for fire or explosion due to an increased internal pressure when excessive heat is generated or when an electrolyte is decomposed. Accordingly, there is a need for a rechargeable battery capable of improving safety. However, I have found that earlier safety device add significantly to the volume of the rechargeable battery. Furthermore, earlier safety devices are prone to being damaged by moisture over time. Therefore, what is needed is an improved safety device that does not add to the volume of the battery and is not prone to damage due to moisture.

SUMMARY OF THE INVENTION

Embodiments of the present invention provide a rechargeable battery, which can improve safety, control operating level of a short-circuiting member, prevent external moisture from being induced to a short-circuiting member, and can efficiently utilize an internal space.

According to one aspect of the present invention, a rechargeable battery is provided, including an electrode assembly, a collector plate electrically connected to the electrode assembly, a case accommodating the electrode assembly and the collector plate, a cap plate sealing the case and having a short-circuiting groove arranged at a lower portion thereof and a short-circuiting member arranged between the cap plate and the collector plate, wherein the short-circuiting member is coupled to the short-circuiting groove of the cap plate, the short-circuiting member may include a holder having an upper groove and a lower groove, a shrinkable ball coupled to the upper groove to shrink according to an internal pressure of the rechargeable battery; and a spring coupled to the lower groove and having an elasticity.

The holder may have a coupling groove arranged at an upper outside portion thereof. The shrinkable ball may include one of polyethylene, polypropylene and a combination of polyethylene and polypropylene. The holder and the spring may both include a conductive material. The holder may be coupled to the short-circuiting groove of the cap plate. The short-circuiting member may be configured such that the holder is short-circuited to the cap plate when an internal pressure of the rechargeable battery exceeds a predetermined pressure.

The collector plate may include a connecting portion electrically connected to the electrode assembly and an extending portion bent at an end of the connecting portion and arranged at the lower portion of the cap plate. The extending portion may include a first planar portion bent and extending from the connecting portion, a second planar portion arranged to be lower than the first planar portion and a curved portion connecting the first planar portion to the second planar portion. The short-circuiting member may be arranged on the second planar portion of the collector plate. The rechargeable battery may also include a lower insulation member closely contacting the lower portion of the cap plate and may have a short-circuiting hole corresponding to the short-circuiting groove of the cap plate. The lower insulation member may have a protrusion protruding toward the short-circuiting hole. The short-circuiting member may be coupled to the short-circuiting hole. The collector plate may be coupled to the inside of the lower insulation member.

According to another aspect of the present invention, there is provided a rechargeable battery that includes an electrode assembly, a collector plate electrically connected to the electrode assembly, a case accommodating the electrode assembly and the collector plate, a cap plate sealing the case and having a recess arranged on a bottom side thereof and a safety device arranged between the cap plate and the collector plate at a location that corresponds to the recess in the cap plate, wherein the safety device includes a conductive holder having an upper recess facing the cap plate and a lower recess facing the collector plate, a conductive spring having an elasticity and being arranged within the lower recess of the conductive holder, and an insulating elastic member arranged within the upper recess of the holder.

During normal operation of the rechargeable battery, the conductive holder may be stationary and the insulating elastic member may exact an equal and opposite force on the conductive holder than the conductive spring. The conductive holder may be adapted to move towards the cap plate and form electrical contact with the cap plate when an internal pressure of the rechargeable battery rises above a predetermined value. The collector plate may be electrically shorted to the cap plate upon the conductive holder contacting the cap plate. The insulating elastic member may be a shrinkable ball adapted to shrink upon a rise of an internal pressure of the rechargeable battery. The conductive spring may be electrically connected to the collector plate. The rechargeable battery may also include an insulation member arranged on the bottom side of the cap plate and being perforated by an aperture at a location that corresponds to the recess in the bottom side of the cap plate, the conductive holder may be arranged within said aperture in said insulation member.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, embodiments of embodiments of the invention will be described in detail with reference to the accompanying drawings such that they can easily be made and used by those skilled in the art.

Figure 1:
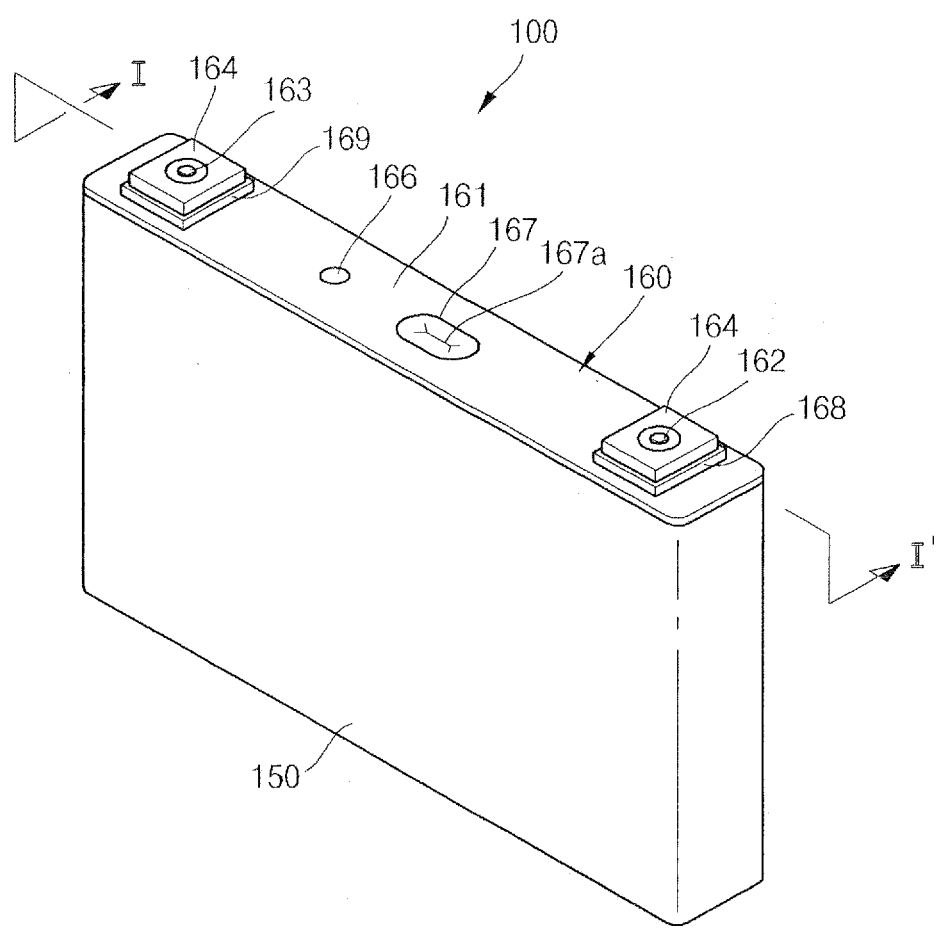
FIG. 1 is a perspective view of a rechargeable battery according to an embodiment of the present invention.
Figure 2:
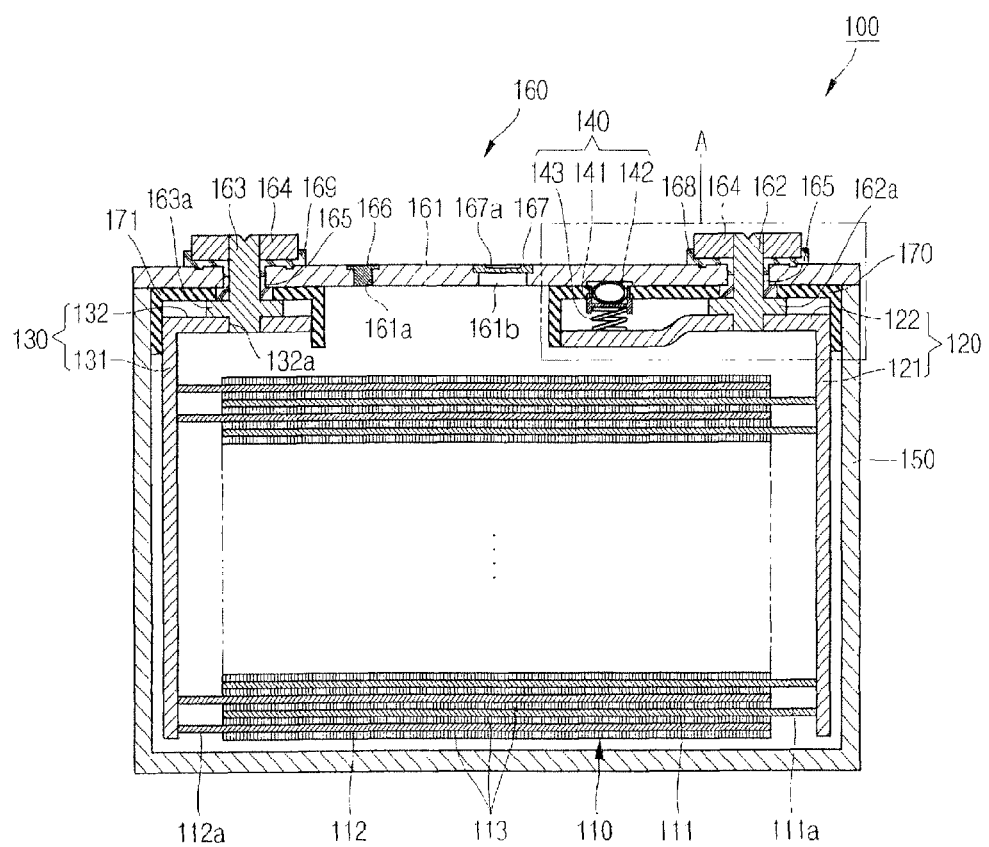
FIG. 2 is a cross-sectional view of the rechargeable battery taken along the line I-I' of FIG. 1.
Figure 3:
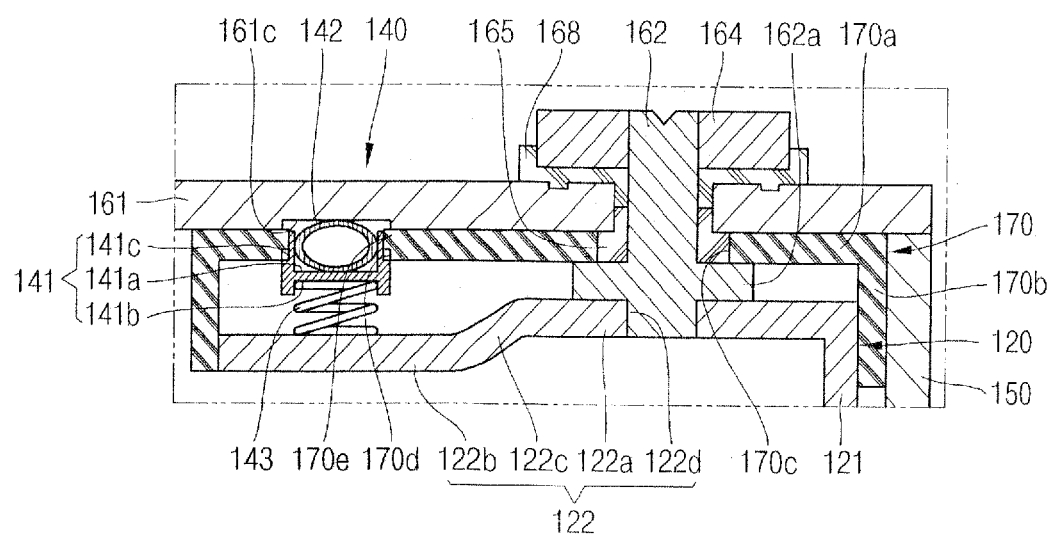
FIG. 3 is an enlarged cross-sectional view of portion 'A' of FIG. 2 during normal operation of the rechargeable battery.
Figure 4:
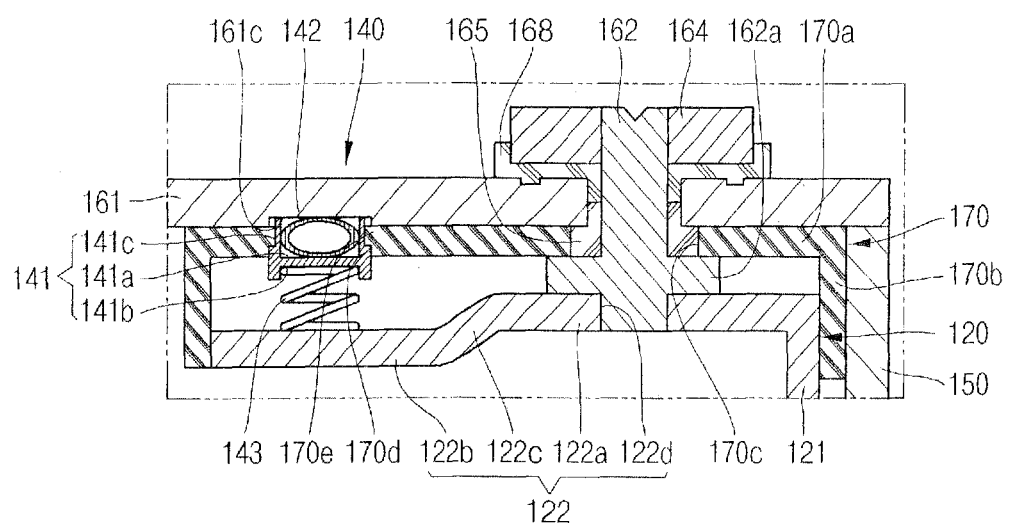
FIG. 4 is a cross-sectional view of portion 'A' of FIG. 2 when a pressure inside the rechargeable battery exceeds a predetermined value, illustrating a short-circuiting member being short-circuited to a cap plate.
Figure 5:
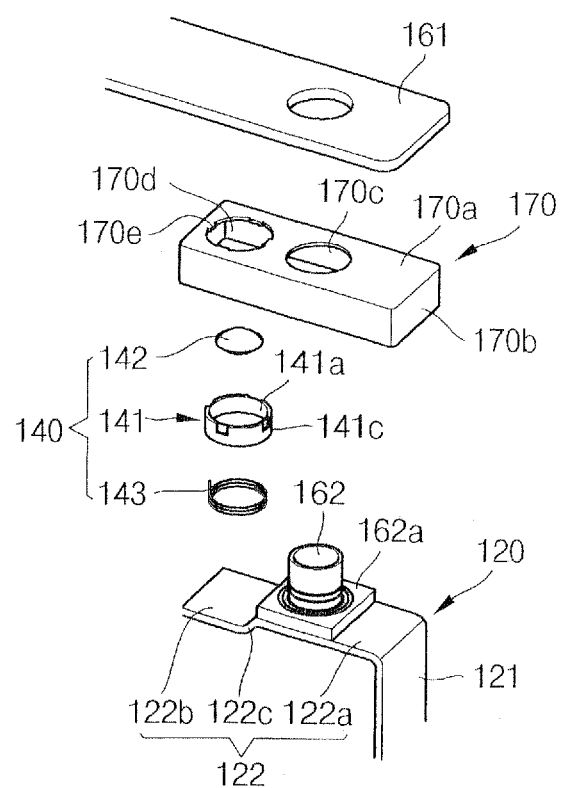
FIG. 5 is a partially exploded perspective view illustrating a configuration shown in FIG. 3.

Turning now to the figures, FIG. 1 is a perspective view of a rechargeable battery according to an embodiment of the present invention, FIG. 2 is a cross-sectional view of the rechargeable battery taken along the line I-I' shown in FIG. 1, FIG. 3 is an enlarged cross-sectional view of portion 'A' of FIG. 2 during normal operation of the rechargeable battery, FIG. 4 is a cross-sectional view illustrating portion 'A' of FIG. 2 when short-circuiting member is being short-circuited to a cap plate, and FIG. 5 is a partially exploded perspective view illustrating a configuration shown in FIG. 3.

Referring to FIGS. 1 to 5, the rechargeable battery 100 according to the illustrated embodiment includes an electrode assembly 110, a first collector plate 120, a second collector plate 130, a short-circuiting member 140, a case 150, and a cap assembly 160.

The electrode assembly 110 is formed by winding or stacking a stacked structure of a first electrode plate 111, a separator 113 and a second electrode plate 112, which are thin film-shaped or layer-shaped. Here, the first electrode plate 111 may serve as a negative electrode and the second electrode plate 112 may serve as a positive electrode, however the polarities of the first electrode plate 111 and the second electrode plate 112 may be altered and still be within the scope of the present invention.

The first electrode plate 111 is formed by coating a first electrode active material, such as graphite or carbon, on a first electrode current collector made out of a nickel or copper metallic foil, and includes a first electrode uncoated portion 111a that has no first electrode active material coated thereon. The first electrode uncoated portion 111a becomes a path of the flow of current between the first electrode plate 111 an outside of the rechargeable battery 100, however, the present invention is in no way limited by the material used for the first electrode plate 111.

The second electrode plate 112 is formed by coating a second electrode active material such as a transition metal oxide on a second electrode current collector, the second electrode current collector being an aluminum metallic foil. The second electrode includes an uncoated portion 112a that has no second electrode active material coated thereon. The second electrode uncoated portion 112a becomes a path of the flow of current between the second electrode plate 112 and an outside of the rechargeable battery 100, however the present invention is in now way limited by the material used for the second electrode plate 112.

The separator 113 is arranged between the first electrode plate 111 and the second electrode plate 112 to prevent an electric short circuit therebetween and to allow lithium ions to move. The separator 113 may be made out of polyethylene, polypropylene or a composite film thereof, however the present invention is in no way limited by the material used for the separator 113.

The electrode assembly 110 is substantially accommodated within case 150 together with an electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$, or $LiBF_4$. In addition, the electrolyte may be in a liquid, solid or gel phase.

The first collector plate 120 and the second collector plate 130 are coupled to opposing ends of the electrode assembly 110 and are electrically connected to the first electrode plate 111 and the second electrode plate 112, respectively. The first collector plate 120 is made out of a conductive material such as copper or a copper alloy and contacts the first electrode uncoated portion 111a that protrudes toward one end of the electrode assembly 110, so that the first collector plate can be electrically connected to the first electrode plate 111. The first collector plate 120 includes a first connecting portion 121 and a first extending portion 122.

The first connecting portion 121 has a plate-shape and contacts the first electrode uncoated portion 111a of first electrode plate 111. Preferably, the first connecting portion 121 is welded to the first electrode uncoated portion 111a.

The first extending portion 122 of the first collector plate 120 is bent and extends from an end of the first connecting portion 121 and has a plate shape. In addition, the first extending portion 122 is installed between a top portion of the electrode assembly 110 and a bottom portion of the cap assembly 160, and is coupled to the inside of a first lower insulation member 170 of cap assembly 160. A first electrode terminal 162 and the short-circuiting member 140 are coupled to the first extending portion 122. The first extending portion 122 includes a first planar portion 122a, a second planar portion 122b and a curved portion 122c. The curved portion 122c connects the first planar portion 122a to the second planar portion 122b and is inclined.

The first planar portion 122a is bent and extends from an end of the first connecting portion 121 and is flatly formed. A first terminal hole 122d perforates the first planar portion 122a. The first electrode terminal 162 is fitted into and coupled to the first terminal hole 122d so that the first collector plate 120 and the first electrode terminal 162 are electrically connected.

The second planar portion 122b is spaced apart from the first planar portion 122a and is flatly formed. The second planar portion 122b is lower than the first planar portion 122a and is thus closer to the electrode assembly 110 and further from the cap plate 161 than the first planar portion 122a. Accordingly, a step difference is created between the first planar portion 122a and the second planar portion 122b. In addition, the short-circuiting member 140 is arranged on top portion of the second planar portion 122b. That is to say, in order to provide space for the short-circuiting member 140 on a top side of the second planar portion 122b of first collector plate 120, the second planar portion 122b is formed to be lower than the first planar portion 122a.

The second collector plate 130 is made out of a conductive material such as aluminum or an aluminum alloy and contacts the uncoated portion 112a of the second electrode 112 that protrudes toward the other end of the electrode assembly 110 so that the second collector plate 130 is electrically connected to the second electrode plate 112. The second collector plate 130 includes a second connecting portion 131 and a second extending portion 132.

The second connecting portion 131 is plate-shaped and contacts the second electrode uncoated portion 112a of the second electrode 112. The second connecting portion 131 is preferably welded to the second electrode uncoated portion 112a of the second electrode 112.

The second extending portion 132 is bent and extends from an end of the second connecting portion 131 and also has a plate shape. In addition, the second extending portion 132 is installed between the top portion of the electrode assembly 110 and the bottom portion of the cap assembly 160, and is coupled to the inside of a second lower insulation member 171 of the cap assembly 160. A second terminal hole 132a perforates the second extending portion 132. A second electrode terminal 163 is arranged within and is coupled to the second terminal hole 132a. Accordingly, the second collector plate 130 and the second electrode terminal 163 are electrically connected.

The short-circuiting member 140 is electrically connected to the first electrode terminal 162 through the first collector plate 120, and the cap plate 161 is electrically connected to the second electrode terminal 163 through a connecting member 169. The short-circuiting member 140 is installed in a short-circuiting groove 161c (or recess) arranged on a bottom side of the cap plate 161 of the cap assembly 160. Short-circuiting member 140 forms a short circuit with cap plate 161 only when the internal pressure of the rechargeable battery 100 exceeds a predetermined pressure. When this occurs, the first electrode terminal 162 and the second electrode terminal 163 are shorted together, thereby discharging the rechargeable battery 100. Accordingly, the short-circuiting member 140 can prevent the rechargeable battery 100 from burning or exploding. The short-circuiting member 140 includes a holder 141, a shrinkable ball 142 and a spring 143.

The holder 141 is made out of a conductive material and is arranged within a short-circuiting hole 170d of the first lower insulation member 170 of the cap assembly 160. In detail, as shown in FIG. 3, the holder 141 includes an upper groove 141a (or upper recess) arranged at an upper portion thereof, a lower groove 141b (or lower recess) arranged at an lower portion thereof, and a coupling groove 141c arranged at an upper outside portion thereof. The shrinkable ball 142 is arranged within the upper groove 141a, and the spring 143 is arranged within the lower groove 141b. Here, the holder 141 is insulated from the cap plate 161 by the shrinkable ball 142 and the holder 141 is electrically connected to the first collector plate 120 by the spring 143. Since the holder 141 is pushed away by each of the shrinkable ball 142 and the spring 143 with equal and opposite forces during normal operation of the rechargeable battery 100, holder 141 is spaced-apart from the cap plate 161.

As shown in FIG. 4, when the internal pressure of the rechargeable battery 100 exceeds a predetermined pressure, the shrinkable ball 142 shrinks, causing the force of the shrinkable ball 142 pushing the holder 141 away from cap plate 161 to become smaller than the force of the spring 143 pushing the holder 141 towards cap plate 161, resulting in the holder 141 moving upwards and causing the coupling groove 141c to engage with a protrusion 170e of the first lower insulation member 170. Accordingly, the holder 141 comes into a contact with the cap plate 161, and the first collector plate 120 and the cap plate 161 are shorted together.

The shrinkable ball 142 is arranged between the upper groove 141a of the holder 141 and the short-circuiting groove 161c of the cap plate 161, and is made out of an insulating material. In addition, the shrinkable ball 142 is an inflated elliptical ball, and a top portion thereof contacts the cap plate 161 and a bottom portion thereof contacts the upper groove 141a of the holder 141. Accordingly, the shrinkable ball 142 insulates the holder 141 from the cap plate 161 during normal operation of the rechargeable battery 100. However, when the internal pressure of the rechargeable battery 100 exceeds a predetermined pressure, the shrinkable ball 142 shrinks, causing the holder 141 to directly contact the cap plate 161. The shrinkable ball 142 is made out of a shrinkable material according to the pressure within the rechargeable battery 100, for example, polyethylene, polypropylene, or a combination of polyethylene and polypropylene.

The spring 143 is arranged between the lower groove 141b of the holder 141 and the second planar portion 122b of the first collector plate 120, and is made out of a conductive material. The spring 143 electrically connects the holder 141 to the first collector plate 120. During normal operation of the battery, the force of the spring 143 pushing on the holder 141 is maintained to be equal and opposite to the force of the shrinkable ball 142 pushing on the holder 141. However, when the internal pressure of the rechargeable battery 100 exceeds a predetermined, the shrinkable ball 142 shrinks so that the force of the shrinkable ball 142 pushing on the holder 141 becomes smaller than the force of the spring 143 pushing on the holder 141. Thus, the spring 143 pushes up the holder 141 to allow the holder 141 to contact the cap plate 161. Accordingly, the cap plate 161 and the first collector plate 120 are short-circuited together, thereby shorting together the first electrode terminal 162 to the second electrode terminal 163, thereby discharging the rechargeable battery 100.

The case 150 is made out of aluminum, an aluminum alloy, or a conductive metal such as nickel-plated steel, and has a substantially hexahedral shape having an opening through which the electrode assembly 110, the first collector plate 120 and the second collector plate 130 are inserted and arranged. Although the opening is not illustrated in FIG. 2 because the case 150 and the cap assembly 160 are in an assembled state, the peripheral portion of the cap assembly 160 substantially corresponds to the opening in case 150. Meanwhile, the interior surface of the case 150 is insulated, so that the case 150 is electrically insulated from the electrode assembly 110, the first collector plate 120, the second collector plate 130 and the cap assembly 160. Here, the case 150 may serve as an electrode having a polarity, for example, a positive polarity.

The cap assembly 160 is coupled to the case 150. In detail, the cap assembly 160 includes a cap plate 161, a first electrode terminal 162, a second electrode terminal 163, a terminal plate 164 and a gasket 165. In addition, the cap assembly 160 may also include a plug 166, a safety vent 167, a first upper insulation member 168, a connecting member 169, a first lower insulation member 170, and a second lower insulation member 171.

The cap plate 161 seals the opening of the case 150, and may be made out of the same material as the case 150. Here, the cap plate 161 may have the same polarity as the case 150. In addition, the cap plate 161 may include an electrolyte injection hole 161a, a vent hole 161b, and a short-circuiting groove 161c. Here, the short-circuiting groove 161c provides a space for the shrinkable ball 142a and a space in which the holder 141 can move upward to contact the cap plate 161 as the shrinkable ball 142 shrinks when the internal pressure of the rechargeable battery 100 exceeds the predetermined pressure.

The first electrode terminal 162 penetrates one side of the cap plate 161 and protrudes and extends upward by a predetermined length. In addition, the first electrode terminal 162 is electrically connected to the first collector plate 120. The first electrode terminal 162 may have a pillar shape. A flange 162a is formed at a lower portion of the first electrode terminal 162 to prevent the first electrode terminal 162 from being dislodged from the cap plate 161. A region of the first electrode terminal 162 arranged at the lower portion of the flange 162*a* is fitted into the first terminal hole 122*d* of the first collector plate 120. In addition, an upper portion of the first electrode terminal 162 is coupled to the terminal plate 164 by a rivet. During normal operation of the rechargeable battery 100, the first electrode terminal 162 is electrically insulated from the cap plate 161.

The second electrode terminal 163 penetrates the other side of the cap plate 161 and protrudes and extends upward by a predetermined length. In addition, the second electrode terminal 163 is electrically connected to the second collector plate 130. The second electrode terminal 163 may include a flange 163*a*. Unlike the first electrode terminal 162 that has a first upper insulation member 168 in addition to gasket 165 to insulate the first electrode terminal 162 from the cap plate 161, the second electrode terminal 163 has a conductive connecting member 169 that electrically connects the second electrode terminal 163 to the cap plate 161. Aside from this conductive connecting member 169, since the second electrode terminal 163 has the same configuration as the first electrode terminal 162, a repeated description thereof will not be given here.

The terminal plate 164 is coupled to top portions of the first electrode terminal 162 and the second electrode terminal 163. Then, the top portions of the first electrode terminal 162 and the second electrode terminal 163 are riveted, thereby fixing the terminal plate 164 to the first electrode terminal 162 and the second electrode terminal 163.

Gaskets 165 are made out of an insulating material, and seal regions between the first electrode terminal 162 and the cap plate 161 and between the second electrode terminal 163 and the cap plate 161. The gaskets 165 also may prevent external moisture from permeating into the secondary battery 100 and prevent the electrolyte accommodated within the secondary battery 100 from effusing to an outside.

The cap assembly 160 further includes plug 166 to seal the electrolyte injection hole 161*a* of the cap plate 161 and safety vent 167 arranged within vent hole 161*b* of the cap plate 161, safety vent 167 having a notch 167*a* to allow the safety vent 167 to open at a preset pressure.

The first upper insulation member 168 is formed between the first electrode terminal 162 and the cap plate 161 and is configured such that the first electrode terminal 162 is fitted thereinto. The first upper insulation member 168 closely contacts the cap plate 161 and the gasket 165. The first upper insulation member 168 insulates the first electrode terminal 162 from the cap plate 161.

The connecting member 169 is disposed between the second electrode terminal 163 and the cap plate 161 and is configured such that the second electrode terminal 163 is fitted thereinto. In addition, the connecting member 169 closely contacts the cap plate 161 and the gasket 165 through the terminal plate 164. The connecting member 169 electrically connects the second electrode terminal 163 to the cap plate 161.

The first lower insulation member 170 is formed between the first collector plate 120 and the cap plate 161 to cover the first extending portion 122 of the first collector plate 120. The first lower insulation member 170 is made out of an insulating material to prevent an unwanted short circuit from occurring between the first collector plate 120 and the cap plate 161. The first lower insulation member 170 may include a top surface 170*a* that contacts the bottom surface of the cap plate 161, and a side surface 170*b* extending from edges of the top surface 170*a* toward the electrode assembly 110. Here, the first lower insulation member 170 may further include a through-hole 170*c* and a short-circuiting hole 170*d*. The through-hole 170*c* may be formed at a region corresponding to the first electrode terminal 162 to allow the first electrode terminal 162 to pass therethrough. The short-circuiting hole 170*d* is formed at a region corresponding to the short-circuiting member 140 and provides a path in which the internal pressure of the rechargeable battery 100 can influence the holder 141 and the shrinkable ball 142, so that when the internal pressure of the rechargeable battery 100 increases, the shrinkable ball 142 shrinks and the holder 141 can move upward. Additionally, first insulation member 170 also includes a protrusion 170*e* protruding toward the short-circuiting hole 170*d* to engage with the coupling groove 141*c* of the holder 141.

The second lower insulation member 171 is formed between the second collector plate 130 and the cap plate 161 to cover the second extending portion 132 of the second collector plate 130. The second lower insulation member 171 is made out of an insulating material to prevent an unwanted short circuit from occurring between the second collector plate 130 and the cap plate 161.

As described above, the rechargeable battery 100 according to the embodiment of the present invention includes the short-circuiting member 140 including the holder 141, the shrinkable ball 142 and the spring 143. The first collector plate 120 is short-circuited to the cap plate 161 in an event of over-charge occurring to the rechargeable battery 100. Accordingly, the rechargeable battery 100 can prevent fire or explosion, thereby improving safety.

In addition, in the rechargeable battery 100 according to one embodiment of the present invention, since the short-circuiting member 140 operates by mechanical properties of the shrinkable ball 142 and the spring 143, the operating level of the short-circuiting member 140 can be controlled.

Further, since the rechargeable battery 100 according to the embodiment of the present invention includes the short-circuiting member 140 having the holder 141, the shrinkable ball 142 and the spring 143, it is possible to prevent external moisture from being induced to the short-circuiting member 140. This is unlike earlier rechargeable batteries where a short circuit can occur due to external moisture being introduced into the short-circuiting member when the short-circuiting member is exposed outside the cap assembly.

Moreover, since the short-circuiting member 140 is incorporated into the rechargeable battery 100 according to the embodiment of the present invention, an internal space can be efficiently utilized, compared to earlier rechargeable batteries where the short-circuiting member is exposed outside.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A rechargeable battery, comprising:
   an electrode assembly;
   a collector plate electrically connected to the electrode assembly;
   a case accommodating the electrode assembly and the collector plate;
   a cap plate sealing the case and having a short-circuiting groove arranged at a lower portion thereof; and
   a short-circuiting member arranged between the cap plate and the collector plate, wherein the short-circuiting member is coupled to the short-circuiting groove of the cap plate, wherein the short-circuiting member includes:

a holder having an upper groove and a lower groove;
a shrinkable ball coupled to the upper groove to shrink according to an internal pressure of the rechargeable battery; and
a spring coupled to the lower groove and having an elasticity.

2. The rechargeable battery of claim 1, wherein the holder has a coupling groove arranged at an upper outside portion thereof.

3. The rechargeable battery of claim 1, wherein the shrinkable ball is comprised of a material selected from a group consisting of polyethylene, polypropylene and a combination of polyethylene and polypropylene.

4. The rechargeable battery of claim 1, wherein the holder and the spring are both comprised of a conductive material.

5. The rechargeable battery of claim 1, wherein the holder is coupled to the short-circuiting groove of the cap plate.

6. The rechargeable battery of claim 1, wherein the short-circuiting member is configured such that the holder is short-circuited to the cap plate when an internal pressure of the rechargeable battery exceeds a predetermined pressure.

7. The rechargeable battery of claim 1, wherein the collector plate comprises:
a connecting portion electrically connected to the electrode assembly; and
an extending portion bent at an end of the connecting portion and arranged at the lower portion of the cap plate.

8. The rechargeable battery of claim 7, wherein the extending portion comprises:
a first planar portion bent and extending from the connecting portion;
a second planar portion arranged to be lower than the first planar portion; and
a curved portion connecting the first planar portion to the second planar portion.

9. The rechargeable battery of claim 8, wherein the short-circuiting member is arranged on the second planar portion of the collector plate.

10. The rechargeable battery of claim 1, further comprising a lower insulation member contacting the lower portion of the cap plate and having a short-circuiting hole corresponding to the short-circuiting groove of the cap plate.

11. The rechargeable battery of claim 10, wherein the lower insulation member has a protrusion protruding toward the short-circuiting hole.

12. The rechargeable battery of claim 10, wherein the short-circuiting member is coupled to the short-circuiting hole.

13. The rechargeable battery of claim 10, wherein the collector plate is coupled to the inside of the lower insulation member.

14. A rechargeable battery, comprising:
an electrode assembly;
a collector plate electrically connected to the electrode assembly;
a case accommodating the electrode assembly and the collector plate;
a cap plate sealing the case and having a recess arranged on a bottom side thereof; and
a safety device arranged between the cap plate and the collector plate at a location that corresponds to the recess in the cap plate, wherein the safety device includes:
a conductive holder having an upper recess facing the cap plate and a lower recess facing the collector plate,
a conductive spring having an elasticity and being arranged within the lower recess of the conductive holder, and
an insulating elastic member arranged within the upper recess of the holder.

15. The rechargeable battery of claim 14, wherein during normal operation of the rechargeable battery, the conductive holder is stationary and the insulating elastic member exacts an equal and opposite force on the conductive holder than the conductive spring.

16. The rechargeable battery of claim 14, wherein the conductive holder is adapted to move towards the cap plate and form electrical contact with the cap plate when an internal pressure of the rechargeable battery rises above a predetermined value.

17. The rechargeable battery of claim 16, wherein the collector plate is electrically shorted to the cap plate upon the conductive holder contacting the cap plate.

18. The rechargeable battery of claim 14, wherein the insulating elastic member is a shrinkable ball adapted to shrink upon a rise of an internal pressure of the rechargeable battery.

19. The rechargeable battery of claim 14, wherein the conductive spring is electrically connected to the collector plate.

* * * * *